Patented Feb. 11, 1941

2,231,123

UNITED STATES PATENT OFFICE 2,231,123

CEMENTITIOUS COMPOSITION

Dean S. Hubbell, Pittsburgh, Pa., assignor to H. H. Robertson Company, Pittsburgh, Pa., a corporation of Pennsylvania No Drawing. Application January 17, 1939, Serial No. 251,339

1 Claim. (Cl. 106—29)

This invention relates to a cementitious composition and more particularly to a cementitious composition embodying magnesium oxychloride cement.

One object of the invention is to provide a novel and improved magnesium oxychloride cementitious composition possessing increased resilience as compared with prior compositions of this character and having sufficient strength in both the wet and dry state to enable the composition to be used for all of the various commercial purposes for which magnesium oxychloride cementitious compositions are now used.

A further and more specific object of the invention is to provide a novel magnesium oxychloride cementitious composition which is particularly suitable for use in the production of floorings possessing resilience, and quietness and softness under foot, together with minimum tendency to crack and sufficient strength to enable the composition to be satisfactorily used for this purpose.

With these objects in view, and such others as may hereinafter appear, the invention consists in the magnesium oxychloride cementitious compositions hereinafter described and particularly defined in the claim at the end of this specification.

As set forth in my United States Patents Nos. 2,058,984, 2,058,985, 2,058,986, and 2,058,987, the strength and water resistance of magnesium oxychloride cements has been greatly increased by the incorporation of small amounts of finely divided copper or cuprous oxide, and the use of these improved magnesium oxychloride cements has covered a wide range of industrial and commercial uses. For certain purposes it has been found desirable to increase the resilience of such magnesium oxychloride cementitious compositions, and recognizing the desirability of incorporating fibrous material therein, extended experiments have been made with a wide variety of animal and vegetable fibers. Some fibers have been found open to the objection that they are unstable and rot or otherwise disintegrate in the cementitious composition, and others may only be incorporated therein with difficulty. A great many fibers were found to impart very little resilience principally because of the fact that they existed as individual strands which lost all springiness when completely encased in the cement. Others seriously detracted from the soundness and strength of the cementitious composition.

In the past wood fiber has been most extensively used as a fibrous filler for various magnesite and similar cementitious compositions. Its cheapness, ease of incorporation in the mix, together with the excellent workability produced in the plastic cement have not, however, offset the fact that its use very appreciably reduces the water resistance and strength and soundness of the cementitious compositions into which it is incorporated. Some wood fiber contains many organic constituents that are relatively easily decomposed, thus detracting from the stability and durability of the cementitious compositions. In attempting to overcome the instability produced by certain wood fibers, an attempt was made to utilize the purer cellulose fibers, but the fact that the purer cellulose fibers were obtainable usually only in single strands rendered the fibers unsuitable for the purpose of increasing the resiliency of the cementitious composition because of the fact that the single strands become encased in cement, thus practically destroying all of the resiliency of the individual strands. In addition, the strength of the cementitious composition is substantially reduced probably because of the fact that the tensile strength of plant fibers depends to an appreciable extent upon the ability of the individual fibers to move on each other and distribute strain.

As a result of experimentation and research, a fibrous material was finally discovered possessing all of the desired characteristics and which was found to produce magnesium oxychloride cementitious compositions far superior to any of the others heretofore employed, particularly with respect to increased resilience without substantial reduction in strength in both the wet and dry states. This fibrous material comprises the short strands of the original cotton cords with or without some adhering rubber in the condition resulting from the shredding or grinding into fragments of old automobile tires. The cord fragments, whose length depends upon the setting of the grinding machine, are still tightly twisted bundles of high quality, long staple cotton fiber, and have lost little of their original strength. Their use in magnesium oxychloride cement compositions, and particularly in copper bearing magnesium oxychloride cement compositions, results in mixtures which not only have greater resilience than obtained with other fibers, but this improvement is accomplished with minimum reduction in strength and water resistance. In producing a magnesium oxychloride cementitious composition, suitable for flooring and possessing the desired increased resilience, it is preferred to incorporate a substantial amount of mineral filler in a copper bearing magnesium oxychloride cement of the type set forth in my patents above referred to, and to also incorporate in such composition a minor proportion of the reclaimed cotton from tire casings. For some purposes it may be desirable to incorporate a small proportion of organic material as an aggregate, preferably in granular form, such as hardwood, sawdust or walnut shell flour. A typical improved flooring comprises:

| | Parts by weight |
|---|---|
| Plastic magnesium oxide | 22 |
| Pulverized silica | 20 |
| Silica sand | 40 |
| Asbestos "floats" | 4 |
| Reclaimed cotton from tire carcasses | 4 |
| Copper powder | 10 |

This dry mixture was gaged to workability with a 22° Bé. magnesium chloride solution.

The bundle formation of the fiber obtained in the manner described from the reclaiming of old automobile tires appears to contribute principally to the desired resiliency of the cementitious composition while maintaining the strength and water resistance thereof.

The utility of the present magnesium oxychloride cementitious composition is illustrated by the following comparative tests of magnesium oxychloride cements of the compositions identified in Tables I, II, III and IV. Table No. IV illustrates a copper bearing magnesium oxychloride cement suitable for flooring and similar purposes and embodying the reclaimed cotton from the tire casings. Tables I, II and III illustrate the compositions of comparative magnesium oxychloride content containing no fiber, maple sawdust, and cork respectively.

PHYSICAL CHARACTERISTICS OF SOME MAGNESIUM OXYCHLORIDE COMPOSITIONS THAT INCORPORATE VARIOUS FIBROUS AGGREGATES

TESTED DRY

| | I No animal or vegetable fiber | II Maple sawdust | III Cork | IV Reclaimed cotton |
|---|---|---|---|---|
| Tensile strength, lbs./sq. in | 925 | 572 | 320 | 785 |
| Compressive strength, lbs./sq. in | 12,290 | 4,187 | 2,290 | 5,462 |
| Compressibility at failure, percent of 1" cube | 1.65 | 1.9 | 4.2 | 2.7 |
| Modulus of elasticity in compression | 666,000 | 341,000 | 100,600 | 347,000 |

TESTED WET

| | I | II | III | IV |
|---|---|---|---|---|
| Tensile strength, lbs./sq. in | 615 | 300 | 127 | 435 |
| Compressive strength, lbs./sq in | 7,950 | 2,412 | 866 | 3,112 |
| Compressibility at failure, percent of 1" cube | 1.75 | 2.5 | 3.1 | 3.7 |
| Modulus of elasticity in compression | 455,000 | 153,500 | 46,800 | 177,500 |

Composition of above mixtures (% by weight)

| | I | II | III | IV |
|---|---|---|---|---|
| Plastic magnesium oxide | 22 | 22 | 22 | 22 |
| Pulverized silica | 20 | 20 | 20 | 20 |
| Silica sand | 46 | 36 | 36 | 40 |
| Asbestos "floats" | 2 | 4 | 4 | 4 |
| Maple sawdust | | 8 | | |
| Fine cork granules | | | 8 | |
| Reclaimed cotton from tire carcasses | | | | 4 |
| Copper powder | 10 | 10 | 10 | 10 |

These dry mixtures were gaged to workability with 22° Bé. magnesium chloride solution.

The foregoing tested compositions were selected after extensive experimentation and the compositions of Tables I, II, III and IV represent the mixes which were found to be best of their particular type. For example, the sawdust and cork employed were of the kind found to be best and are employed in the amount that produced the best results, so that the comparative tests clearly measure the relative characteristics of compositions of the different types. It will be noticed that the compositions containing sawdust show only slightly greater resilience than the composition containing no fiber while their wet strengths are substantially less. The compositions containing cork are highly resilient but their strength has been reduced to the point where they cannot give satisfactory performance. The composition illustrated in Table IV, and embodying the present invention, shows excellent resilience together with strength sufficiently high to give satisfactory service in use.

In its broader aspects, the invention contemplates the use of fibers other than cotton for production of the present cementitious composition and any such fibers having the ability of retaining a large percentage of their strength in the magnesium oxychloride cement and which do not disintegrate in such environment may be used.

Having thus described the invention, what is claimed is:

A cementitious composition characterized by its resilience and strength under wet and dry conditions containing the following ingredients in substantially the following proportions:

| | Parts by weight |
|---|---|
| Plastic magnesium oxide | 22 |
| Pulverized silica | 20 |
| Silica sand | 40 |
| Asbestos "floats" | 4 |
| Shredded reclaimed cotton from tire casings | 4 |
| Copper powder | 10 |

Magnesium chloride sufficient to form a plastic mass.

DEAN S. HUBBELL.